(12) United States Patent
Mutikainen et al.

(10) Patent No.: US 9,843,968 B2
(45) Date of Patent: Dec. 12, 2017

(54) METHOD AND APPARATUS FOR MANAGING NETWORK DEVICES

(71) Applicant: NOKIA CORPORATION, Espoo (FI)

(72) Inventors: Jari Mutikainen, Lepsämä (FI); Hannu Bergius, Kangasala (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 155 days.

(21) Appl. No.: 14/761,314

(22) PCT Filed: Jan. 16, 2013

(86) PCT No.: PCT/FI2013/050045
§ 371 (c)(1),
(2) Date: Jul. 16, 2015

(87) PCT Pub. No.: WO2014/111617
PCT Pub. Date: Jul. 24, 2014

(65) Prior Publication Data
US 2015/0365850 A1    Dec. 17, 2015

(51) Int. Cl.
*H04W 76/04*    (2009.01)
*H04W 36/00*    (2009.01)

(52) U.S. Cl.
CPC ..... *H04W 36/0022* (2013.01); *H04W 76/045* (2013.01)

(58) Field of Classification Search
CPC .............. H04W 36/0022; H04W 76/045
See application file for complete search history.

(56) References Cited

U.S. PATENT DOCUMENTS

| 8,903,376 | B2* | 12/2014 | Watfa | ............... | H04W 36/0022 |
| | | | | | 370/331 |
| 9,125,110 | B2* | 9/2015 | Gustavsson | | |
| 9,319,958 | B2* | 4/2016 | Bae | ....................... | H04W 36/30 |
| 9,332,460 | B2* | 5/2016 | Lee | ................... | H04W 36/0022 |
| 2008/0291874 | A1* | 11/2008 | Bae | .................. | H04W 36/0022 |
| | | | | | 370/331 |
| 2010/0291897 | A1* | 11/2010 | Ghai | ..................... | H04W 12/02 |
| | | | | | 455/410 |

(Continued)

FOREIGN PATENT DOCUMENTS

WO    WO 2009142581 A    11/2009
WO    WO 2011053824 A2    5/2011

(Continued)

*Primary Examiner* — Jay P Patel
(74) *Attorney, Agent, or Firm* — Seppo Laine Oy

(57) ABSTRACT

In accordance with an example embodiment of the present invention, there is provided an apparatus, comprising at least one processing core configured to determine that a service access session has commenced, the at least one processing core configured to cause a network procedure to be triggered to cause attachment of the apparatus to change from a first radio access technology to a second radio access technology, and a transmitter configured to cause, during the service access session, a first settings message and a second settings message to be transmitted to a network in accordance with the second radio access technology, wherein the first settings message comprises an indication that the service access session is in progress.

15 Claims, 6 Drawing Sheets receiving in an apparatus a settings message from a user equipment — 610 maintaining open a connection with the user equipment, wherein the connection is maintained open responsive to the settings message comprising an indication that a service access session is in progress or the apparatus determining that the user equipment has undergone a circuit-switched fallback procedure to transmit the settings message — 620

(56) References Cited

U.S. PATENT DOCUMENTS

| | | | |
|---|---|---|---|
| 2011/0069618 A1* | 3/2011 | Wong | H04W 76/022 370/244 |
| 2011/0235580 A1* | 9/2011 | Kanauchi | H04J 11/0069 370/328 |
| 2011/0258300 A1* | 10/2011 | Hao | H04L 65/1016 709/221 |
| 2012/0064884 A1* | 3/2012 | Ramachandran | H04W 36/0022 455/422.1 |
| 2012/0064885 A1* | 3/2012 | Ramachandran | H04W 68/12 455/423 |
| 2012/0106332 A1* | 5/2012 | Tiwari | H04W 60/005 370/230 |
| 2012/0218889 A1* | 8/2012 | Watfa | H04W 60/04 370/230 |
| 2013/0051362 A1* | 2/2013 | Lee | H04W 36/30 370/331 |
| 2013/0070728 A1* | 3/2013 | Umatt | H04W 36/0022 370/331 |
| 2013/0157666 A1* | 6/2013 | Uchino | H04W 4/22 455/437 |
| 2013/0183981 A1* | 7/2013 | Singh | H04W 36/0016 455/437 |
| 2013/0195076 A1* | 8/2013 | Keller | H04W 36/0022 370/331 |
| 2013/0210430 A1* | 8/2013 | Park | H04W 68/02 455/435.1 |
| 2013/0210466 A1* | 8/2013 | Arvidsson | H04W 4/025 455/458 |
| 2013/0265884 A1* | 10/2013 | Brombal | H04W 76/027 370/242 |
| 2014/0113636 A1* | 4/2014 | Lee | H04W 36/00 455/437 |
| 2014/0177592 A1* | 6/2014 | Li | H04W 36/0022 370/331 |
| 2015/0124779 A1* | 5/2015 | Liu | H04W 36/0022 370/331 |

FOREIGN PATENT DOCUMENTS

| | | |
|---|---|---|
| WO | WO 2011053849 A2 | 5/2011 |
| WO | WO 2011119862 A1 | 9/2011 |

* cited by examiner

US 9,843,968 B2

METHOD AND APPARATUS FOR MANAGING NETWORK DEVICES

TECHNICAL FIELD

The present application relates generally to managing access technology selection and service access.

BACKGROUND

Mobile communication devices, for example cellular telephones, may be configured to communicate with more than one type of radio-access network. For example, a device may be capable of attaching to a long term evolution, LTE, network in addition to being capable of attaching to a wideband code division multiple access, WCDMA, and global system for mobile communications, GSM, networks. LTE is an example of a packet-switched only network in the sense that LTE does not support circuit-switched, CS, services such as CS voice.

In compound LTE-WCDMA networks, subscribers may be provided with access to services, such as internet access and messaging. Other services, known as supplementary services, may include call handling such as call forwarding.

In compound networks, one section of the network may be tasked with handling specific services. In an LTE-WCDMA network, for example, services may be provided to users via LTE radio interfaces and WCDMA radio interfaces, separately. Such a compound network may be seen as comprising an LTE radio-access network, a LTE core network, a WCDMA radio-access network and a WCDMA core network. The LTE and WCDMA core networks may be enabled to communicate with each other, in some cases they may even be seen as a unitary core network.

Where a device attached to a packet-switched only network needs to access a circuit-switched service, the device may undergo a network procedure to obtain the service by changing its attachment to a network or interface that supports CS services. In the example of a LTE-WCDMA compound system, a device attached to the LTE radio access network, RAN, may change the attachment interface to WCDMA RAN to obtain a CS service. One procedure for changing attachment to a CS-capable RAN responsive to a determined need to obtain CS service is circuit-switched fallback, CSFB.

Interfaces that support CS service include WCDMA and GSM. Interfaces that are packet-switched only include LTE and wireless local area network, WLAN, interfaces.

SUMMARY

Various aspects of examples of the invention are set out in the claims.

According to a first aspect of the present invention, there is provided an apparatus, comprising at least one processing core configured to determine that a service access session has commenced, the at least one processing core configured to cause a network procedure to be triggered to cause attachment of the apparatus to change from a first radio access technology to a second radio access technology, and a transmitter configured to cause, during the service access session, a first settings message and a second settings message to be transmitted to a network in accordance with the second radio access technology, wherein the first settings message comprises an indication that the service access session is in progress.

According to a second aspect of the present invention, there is provided a method, comprising determining, in an apparatus, that a service access session has commenced, causing a network procedure to be triggered to cause attachment of the apparatus to change from a first radio access technology to a second radio access technology, causing, during the service access session, a first settings message and a second settings message to be transmitted to a network in accordance with the second radio access technology, and wherein the first settings message comprises an indication that the service access session is in progress.

According to a third aspect of the present invention, there is provided an apparatus, comprising at least one processor, at least one memory including computer program code, the at least one memory and the computer program code configured to, with the at least one processor, cause the apparatus to at least determine, that a service access session has commenced, and cause a network procedure to be triggered to cause attachment of the apparatus to change from a first radio access technology to a second radio access technology, wherein for the duration of the service access session, first radio access technology capability of the apparatus is disabled.

According to a fourth aspect of the present invention, there is provided a method, comprising determining that a service access session has commenced, and causing a network procedure to be triggered to cause attachment of the apparatus to change from a first radio access technology to a second radio access technology, wherein for the duration of the service access session, first radio access technology capability of the apparatus is disabled.

According to a fifth aspect of the present invention, there is provided an apparatus, comprising at least one processor, at least one memory including computer program code, the at least one memory and the computer program code configured to, with the at least one processor, cause the apparatus to at least receive a settings message from a user equipment, and maintain open a connection with the user equipment, wherein the connection is maintained open responsive to the settings message comprising an indication that a service access session is in progress or the apparatus determining that the user equipment has undergone a circuit-switched fallback procedure to transmit the settings message.

According to a sixth aspect of the present invention, there is provided a method, comprising receiving in an apparatus a settings message from a user equipment, and maintaining open a connection with the user equipment, wherein the connection is maintained open responsive to the settings message comprising an indication that a service access session is in progress or the apparatus determining that the user equipment has undergone a circuit-switched fallback procedure to transmit the settings message.

According to further aspects of the present invention, computer programs are provided which are configured to cause methods in accordance with the above aspects to be performed, when run.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
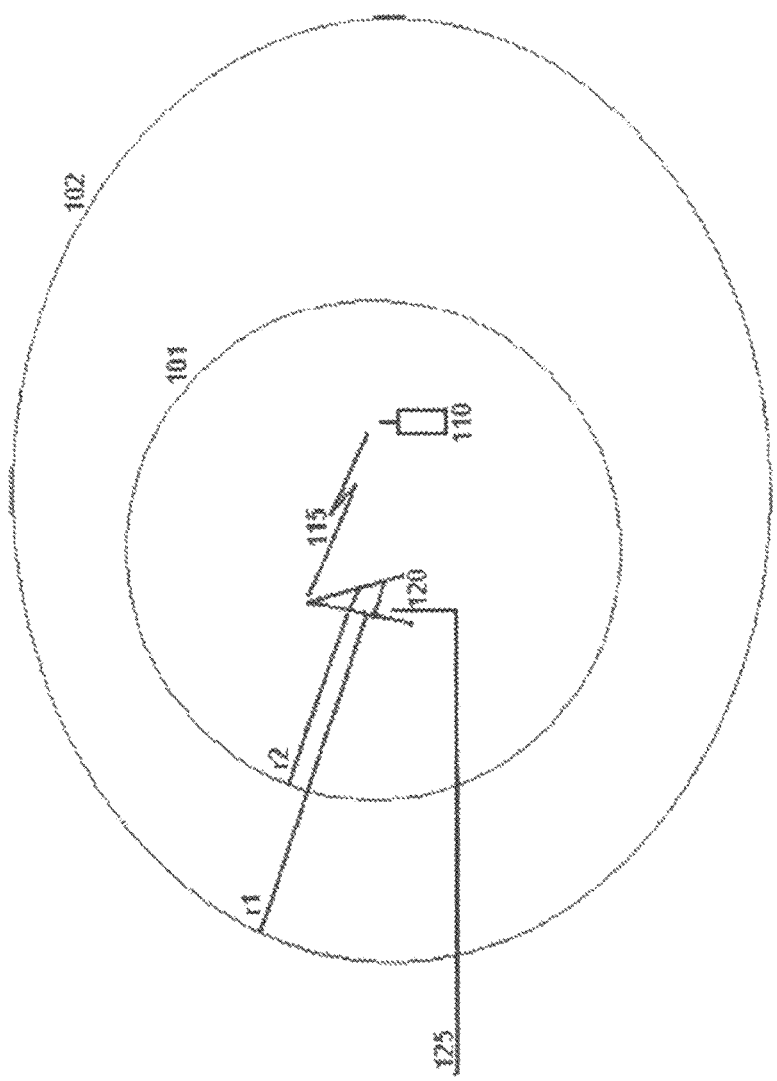
FIG. 1 illustrates part of an example system capable of supporting at least some embodiments of the invention.

FIG. 1 illustrates part of an example system capable of supporting at least some embodiments of the invention. Illustrated is device 110, which may comprise a desktop or laptop computer, tablet computer, smartphone, cellular phone, mobile phone, user terminal or other connected device. Device 110 is illustrated as being in radio contact with base station 120, via wireless connection 115. Wireless connection 115 may comprise an uplink for conveying information from device 110 to base station 120. Wireless connection 115 may comprise a downlink for conveying information from base station 120 to device 110. Wireless connection 115 may operate in accordance with a wireless industry standard, for example LTE, WCDMA, IS-95 or GSM. Base station 120 and device 110 may be configured to communicate with each other, via wireless link 115, using the same wireless industry standard. Base station 120 is illustrated as being in contact with further nodes, which are not illustrated, via connection 125 which may be wire-line or at least in part wireless. Such further nodes may comprise core network nodes, radio-access network controller nodes or other base stations.

In FIG. 1 are illustrated cells 101 and 102. In the illustrated example, cell 101 is a cell controlled by base station 120 in accordance with a first radio access technology. Cell 102 is a cell controlled by base station 120 in accordance with a second radio access technology. The first radio access technology may be a packet-switched only technology and the second radio access technology may support both packet- and circuit-switched services. A cell radius of cell 101 is illustrated as r2, and a cell radius of cell 102 is illustrated as r1. The cell radius of a cell may not be the same in each direction.

As can be seen from FIG. 1, in the illustrated example the cell coverage area of cell 101 overlaps with the cell coverage area of cell 102. Therefore, when device 110 is within the cell coverage area of cell 101, it is in principle capable of communicating with base station 120 using either the first or the second radio access technology. Device 110, the network or both may be furnished with preference rules to facilitate choosing a most preferred radio-access technology for device 110 to attach to, in case of overlapping coverage of more than one possible radio-access technology as in FIG. 1. Therefore wireless connection 115 may conform to the first radio-access technology or the second radio-access technology, in dependence of the preference rules.

Although illustrated as controlled by base station 120, cells 101 and 102 may alternatively be controlled by different base stations. As long as overlapping coverage exists and device 110 has a choice as to which radio-access technology to use, the preference rules may be used to select the radio-access technology to attach to.

Where the first radio-access technology is a packet-switched only technology and has higher spectral and/or cost efficiency, or other advantage over the second radio access technology, the preference rules may consider it to be the most preferred technology, causing device 110 in the system of FIG. 1 to attach to cell 101 in accordance with the first radio-access technology. The packet-switched only technology may provide device 110 with packet-switched access via wireless connection 115, base station 120, connection 125 and other nodes. A user of device 110 may thus be enabled to access information from the internet and place packet-switched voice calls, for example.

In case of a compound system, support of specific services may be provided by specific parts of the compound system. For example, a user of device 110 may be enabled to place at least one of circuit-switched voice calls, access unstructured supplementary service data, or circuit-switched location services via attaching to cell 102 in accordance with the second radio-access technology In detail, a network operator may configure the compound network of FIG. 1 so that certain services, such as circuit-switched voice calls, available to device 110, are managed using the second radio access technology. In this case, order to manage the services, device 110 may be configured to access the second radio access technology section of the compound network and signal to a network node in the second radio access technology section of the compound network tasked with the services, to access the services.

In case device 110 is attached, for example due to the preference rules, to cell 101 according to the first radio access technology when a need arises to access services provided by the circuit-switched part, for example to modify settings of services managed using the second radio access technology section of the compound network, device 110 may be configured to responsively cause a change of attachment, to access the network via cell 102 and the second radio access technology. Device 110 may be configured to cause the change by invoking a network procedure, such as for example a CSFB or other procedure, which triggers a process to change the radio interface, such as for example a handover. Following attachment to cell 102, device 110 may begin sending settings messages to the network node tasked with managing the service or services.

Where device 110 accesses at least one service managed via the second radio access technology, device 110 may transmit more than one settings message, possibly with several seconds in between the settings messages. For example, a user of device 110 may modify more than one service setting value, wherein the user changes the setting values via a user interface of device 110 with several seconds in between, or device 110 initially retrieves from the network the current settings responsive to the user activating a settings user interface of device 110, and thereafter several seconds later the user causes a setting to be changed by interacting with the settings user interface.

In cases where device 110 has changed attachment to the second radio access technology to access the settings, device 110 may be caused to attach to a cell that is not the most preferable cell from the point of view of the preference rules. In detail, the first radio access technology may be more preferable than the second radio access technology which is used to interact with the network node in the second radio access technology section of the compound network tasked with managing the at least one service. In cases where more than one settings message is sent with an interval between the settings messages, the preference rules in place may cause device 110 to change attachment, during the interval between the settings messages, back to the more preferred first radio access technology. If this happens, device 110 will then have to once more change attachment from the first radio access technology to the second radio access technology, for example by triggering or invoking the network procedure, in order to transmit a subsequent settings message. Back-and-forth changes in attachment involve signaling in the network and radio interface as well as delays, wherefore remaining attached to the second radio access technology may be beneficial as long as settings messages are sent from device 110. Signaling in the radio interface may cause interference in the network, reducing its capacity.

A first way for device 110 to remain attached to the second radio access technology is for device 110 to include in the first settings message an indication that the settings message is comprised in a service access session. Device 110 may determine presence of a service access session from the user activating the settings user interface in device 110, for example. As long as the settings user interface is active, the user may or is likely to change settings values. Once the user is finished modifying the settings, for example, he is likely to close the settings user interface, ending the settings adjustment session. The network, being in receipt of the indication that a service access session is ongoing, may keep open a connection with device 110 via the second radio access technology. An example of such a connection is an Iu-CS connection. Additionally or alternatively, a protocol transaction may be kept open via the second radio access technology and cell 102. An example of such a protocol transaction is a mobile radio interface layer 3 REGISTER transaction. In general, the network may take these or other steps to prevent device 110 from returning to the first radio access technology until after the service access session ends. Responsive to an end of the service access session, device 110 may be configured to send a second indication to the network informing the network of the ending, responsive to which the network may cease preventing the device from returning to the first radio access technology. Ceasing preventing the return may comprise releasing a connection and/or protocol transaction with device 110, for example. The network may be furnished with a backup timer to cease preventing the return in case device 110 for some reason fails to send the second indication within a reasonable time. Device 110 may be furnished with a timer, wherein device 110 may be configured to indicate to the network that the service access session has ended responsive to expiry of a predetermined time interval in the timer, even in the absence of user actions indicating the service access session has ended.

A second way for device 110 to remain attached to the second radio access technology is for the network node managing the services settings to use a timer to guarantee a minimum attachment time to the second radio access technology following the first settings message. For example, the network node, which may comprise for example a mobile switching center, MSC, may start the timer responsive to receipt of a settings message requesting the current settings to be sent to device 110. In some embodiments, the network node is configured to only start the timer where the network node determines that the device having sent the first settings message has undergone the network procedure to change attachment to the second radio access technology to send the first settings message. In some embodiments, the timer is started responsive to the first settings message requesting the current settings and the device sending it having undergone the network procedure to change attachment to the second radio access technology to send it. The network node may be enabled to know if the device having sent the first settings message has undergone the network procedure to change attachment to the second radio access technology to send the first settings message from information that is available to the network node in the network.

A third way to remain attached to the second radio access technology is for device 110, responsive at least in part to a determination that a service access session has started, to become operative to disable a first radio-access technology capability of device 110. For example, device 110 may, responsive to a user accessing a settings change user interface or other service-related user interface, perform a re-attach procedure with the network with the first radio access technology capability in a disabled state. Responsive to determining and end of the service access session, device 110 may be configured to perform a new re-attach with the network, this time with the first radio access technology capability enabled. Determining an end of the service access session may comprise detecting that the user exits the settings user interface in device 110. Alternatively the determining may be based on a timer as described above.

Although discussed herein as settings messages, more generally the settings messages may be considered service messages, or service access messages.

In general there is provided a first apparatus, such as for example a user equipment or a control apparatus for inclusion in a user equipment, to control the functioning of the user equipment. Examples of a control apparatus include a chipset and an integrated chip. The first apparatus may comprise at least one processing core configured to determine that a service access session has commenced. The determining may be based on at least one of a user invoking a service access related user interface or transmission of a service-related signaling message, for example. The at least one processing core may be further configured to cause a network procedure to be triggered to cause attachment of the apparatus to change from a first radio access technology to a second radio access technology. The at least one processing core may be comprised in the control apparatus. The triggering of the network procedure may occur responsive to the determination that a service access session starts.

The first apparatus may further comprise a transmitter configured to cause, during the service access session, a first settings message and a second settings message to be transmitted to a network in accordance with the second radio access technology, the first settings message comprising an indication that the service access session is in progress. Where the first apparatus is a user equipment, the transmitter may comprise a radio transceiver comprised in the user equipment. Where the first apparatus comprises a control apparatus, the transmitter may comprise an output pin and port of the control apparatus, which are configured to, when the control apparatus is included in a user equipment, cause a radio transceiver of the user equipment to transmit by effecting signaling along electrical leads internal to the user equipment interconnecting the output pin and port with the radio transceiver.

In some embodiments, the service access session comprises at least one of a service settings adjustment session, an unstructured supplementary service data, USSD, session and a circuit-switched, CS, location services access session. In some embodiments, the network procedure comprises a CSFB procedure. In some embodiments the first radio access technology comprises a packet-switched only technology such as, for example, LTE. In some embodiments, the second radio access technology supports circuit-switched service. Examples of radio access technologies that support circuit-switched service include WCDMA and GSM. In some embodiments, the service access session is a circuit switched service access session.

In embodiments where the service access session comprises a service settings adjustment session, the settings to be adjusted may comprise supplementary services settings. Supplementary services may comprise at least one of call forwarding, call barring and a do not disturb service. Adjusting call forwarding settings may comprise, for example, configuring a new number for calls to be forwarded to, or disabling call forwarding.

In some embodiments, the first settings message comprises a current settings inquiry message. A current settings inquiry message may comprise an implicit or explicit request for the first apparatus to be provided with currently active settings. The current settings inquiry message may comprise an identity of a service the current settings inquiry message relates to. In some embodiments, the second settings message comprises a request to modify at least one settings value.

In some embodiments, the first apparatus is configured to not include the indication in the first settings message when the service access session is not associated with a CSFB procedure. In other words, the first apparatus may be configured to selectively include the indication responsive to the first apparatus initiating the service access session via CSFB and to not include the indication where the service access session is initiated without CSFB, for example where the first apparatus is attached to the second radio access technology to begin with.

Figure 3:
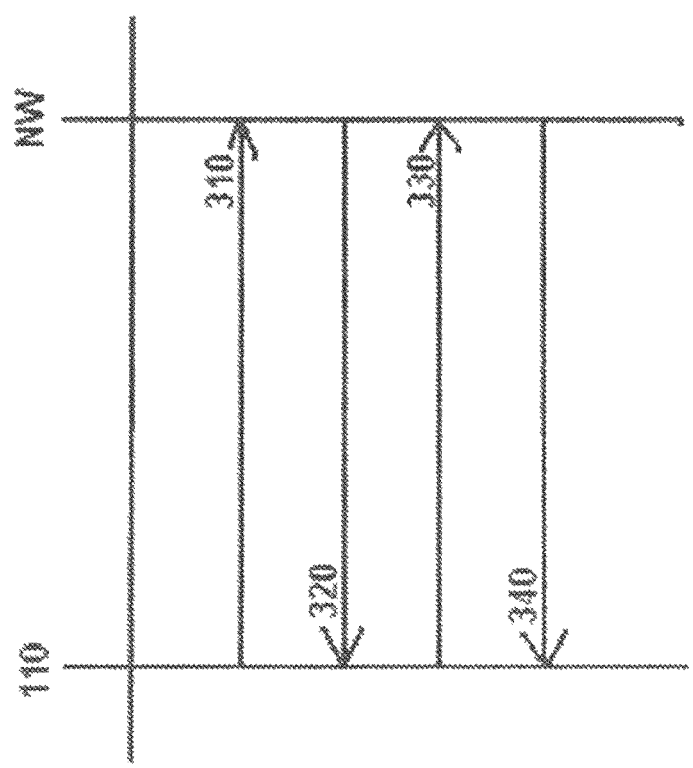
FIG. 3 is a first signaling diagram in accordance with at least some embodiments of the invention.

FIG. 3 is a signaling diagram in accordance with at least some embodiments of the invention. The vertical axes, labeled 110 and NW, correspond to device 110 and the network of FIG. 1, respectively. In phase 310, device 110 transmits, via the second radio access technology, for example using a mobile radio interface layer 3 protocol, a REGISTER message to the network node tasked with managing the at least one service the settings of which are to be adjusted. The REGISTER message of the illustrated embodiments comprises an indication that a service access session, which in this case is a settings adjustment session, is in progress, wherein the indication may be known, for example, as a follow-on indication. The REGISTER message of phase 310 may further comprise indications relating to specific settings that are to be modified. In phase 320, the network node replies to device 110, via the second radio access technology, using a RELEASE COMPLETE message. Responsive to the indication that a service access session is ongoing in the message of phase 310, the network node maintains a connection with device 110 instead of releasing the connection in connection with the RELEASE complete message of phase 320.

In phase 330, device 110 transmits, via the second radio access technology, a second REGISTER message to the network node, the second REGISTER message comprising an indication the service access session has ended. The second indication may comprise a follow-on equals zero indication, for example. The second REGISTER may comprise settings changes in addition to the second indication. Responsive to receiving the second REGISTER, the network node, in phase 340, transmits a second RELEASE COMPLETE message, this time also releasing the connection with device 110 to allow device 110 to return to a more preferred radio access technology.

In an alternative embodiments, the network node may maintain the REGISTER transaction in addition to maintaining the connection with device 110. In these embodiments, the messages of phases 320 and 330 may comprise mobile radio interface layer 3 protocol FACILITY messages. In these embodiments, phase 310 is identical to phase 310 described above, phase 320 comprises a FACILITY message informing of success of changing settings responsive to phase 310, and phase 330 is a FACILITY message comprising the second indication informing of the end of the service access session, responsive to which the network node releases both the REGISTER transaction and the connection with device 110.

Figure 4:
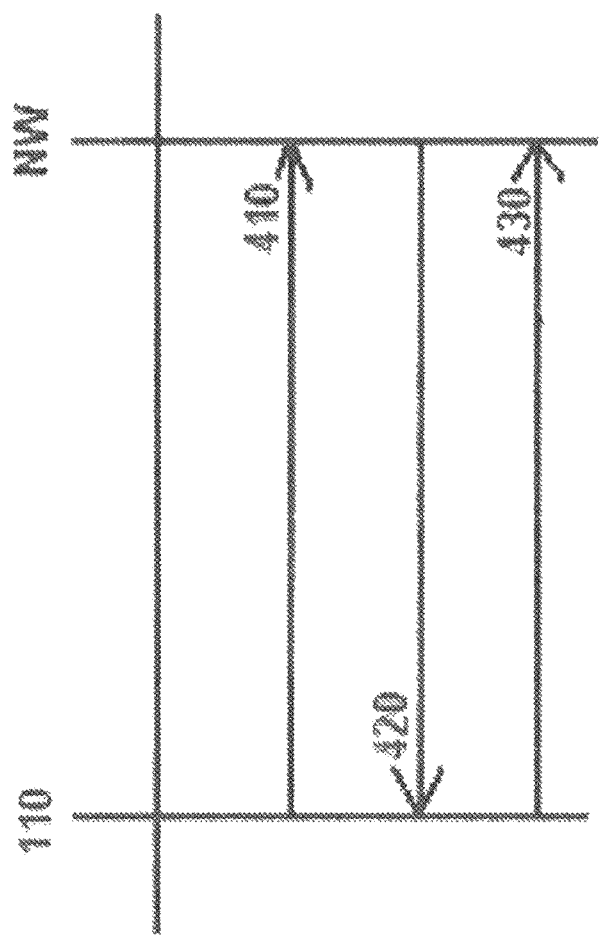
FIG. 4 is a second signaling diagram in accordance with at least some embodiments of the invention.

FIG. 4 is a second signaling diagram in accordance with some embodiments of the invention. FIG. 4 is an alternative signaling for the case where the network node maintains the REGISTER transaction in addition to the connection with device. 110. The message of phase 410 is similar to that of phase 310 described above. In phase 420, the network node responds with a FACILITY message informing of success of changing settings responsive to phase 410. In phase 430 device 110 transmits a RELEASE COMPLETE message to the network node, causing the transaction and the connection to be released with the network node, allowing a return for device 110 to a more preferred radio access technology.

Figure 5:
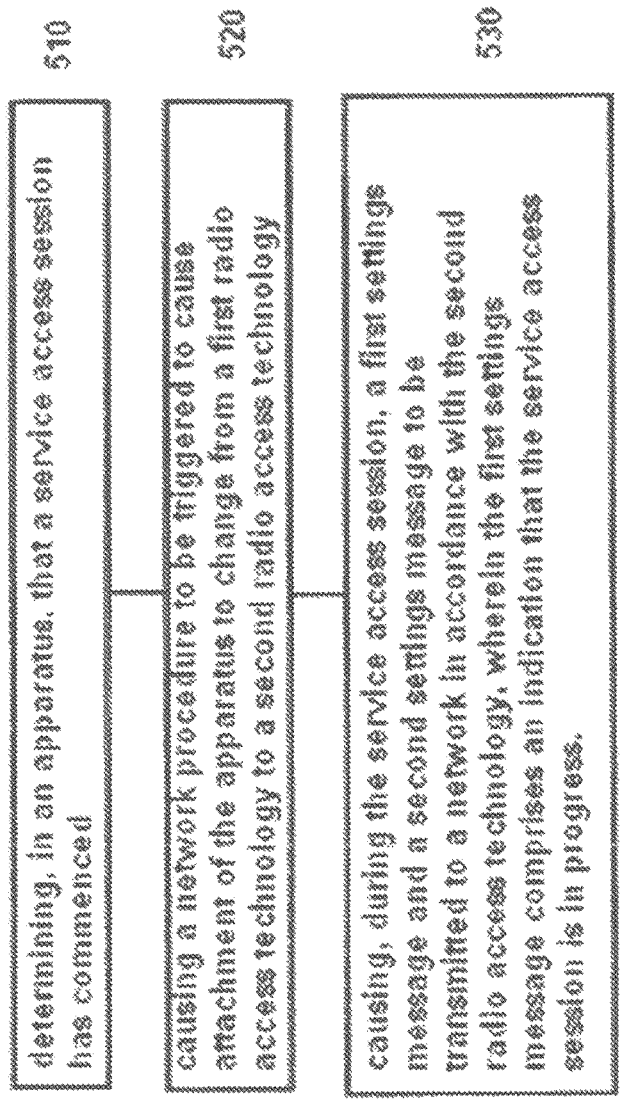
FIG. 5 is a first flowgraph of a method in accordance with at least some embodiments of the invention.

FIG. 5 is a flowgraph of a method in accordance with at least some embodiments of the invention. In phase 510 the method comprises determining, in an apparatus, that a service access session has commenced. In phase 520 the method comprises causing a network procedure to be triggered to cause attachment of the apparatus to change from a first radio access technology to a second radio access technology. In phase 530 the method comprises causing, during the service access session, a first settings message and a second settings message to be transmitted to a network in accordance with the second radio access technology, wherein the first settings message comprises an indication that the service access session is in progress. The phases of the method illustrated in FIG. 5 may be performed in device 110, for example.

Figure 6:
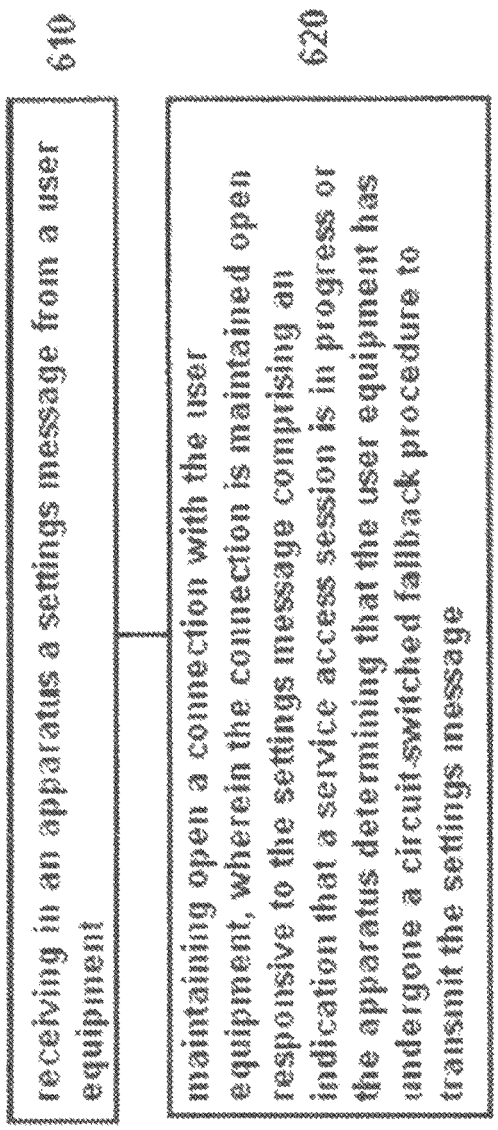
FIG. 6 is a second flowgraph of a method in accordance with at least some embodiments of the invention.

FIG. 6 is a second flowgraph of a method in accordance with at least some embodiments of the invention. In phase 610 the method comprises receiving, in an apparatus, a settings message from a user equipment. In phase 620 the method comprises maintaining open a connection with the user equipment, wherein the connection is maintained open responsive to the settings message comprising an indication that a service access session is in progress or the apparatus determining that the user equipment has undergone a circuit-switched fallback procedure to transmit the settings message. The phases of the method may illustrated in FIG. 6 may be performed in a mobile switching centre, for example.

Figure 2:
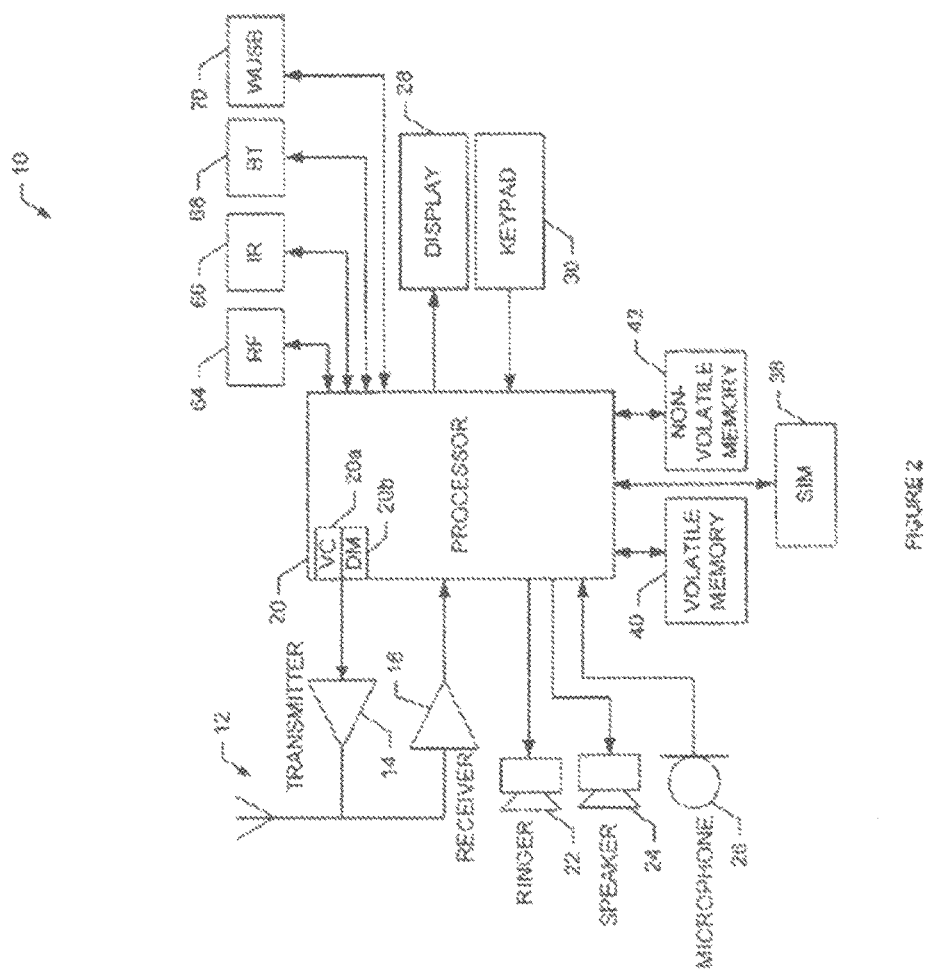
FIG. 2 illustrates a block diagram of an apparatus in accordance with an example embodiment of the invention.

FIG. 2 illustrates a block diagram of an apparatus 10 such as, for example, device 110, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the apparatus, which is described hereinbelowbelow as a mobile terminal, 10, may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that unnecessary transitions between radio access technologies are avoided. Another technical effect of one or more of the example embodiments disclosed herein is that unnecessary signaling is avoided. Another technical effect of one or more of the example embodiments disclosed herein is that delays are reduced.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
determining, in a mobile switching center, that a service access session for a user equipment is in progress, wherein the user equipment has changed attachment from a first radio access technology to a second radio access technology;
maintaining, in response to the determination, an open connection with the user equipment to prevent the user equipment from changing the attachment, during the service access session, from the second radio access technology to the first radio access technology, the open connection distinct from the service access session;
triggering, in response to the determination, a timer; and
releasing the open connection in response to expiration of the timer to enable the user equipment to change the attachment from the second radio access technology to the first radio access technology.

2. The method of claim 1, wherein the service comprises one of a circuit-switched, supplementary, call forwarding, call barring and a do not disturb service.

3. The method of claim 1, wherein the determination is triggered by reception of a message from the user equipment comprising an indication that the service access session is in progress.

4. The method of claim 1, wherein the triggering of the timer is triggered by reception of a message from the user equipment comprising an indication that the service access session is in progress.

5. The method of claim 4, wherein the message comprises one of a service settings adjustment message, a supplementary service adjustment settings message and a current settings inquiry message.

6. The method of claim 1, wherein the user equipment has changed attachment from the first radio access technology to the second radio access technology by a network procedure comprising a circuit-switched fallback procedure, wherein the first radio access technology is a packet-only technology and the second radio access technology supports circuit switched service.

7. The method of claim 1, wherein the first radio-access technology comprises a long term evolution technology and the second radio access technology comprises a wideband code division multiple access technology or a global system for mobile communications, GSM, technology.

8. An apparatus comprising:
at least one processor; and
at least one memory including computer program code;
the at least one memory and the computer program code configured to, with the at least one processor, cause the apparatus to perform at least the following:
determine, in a mobile switching center, that a service access session for a user equipment is in progress, wherein the user equipment has changed attachment from a first radio access technology to a second radio access technology;

maintain, in response to the determination, an open connection with the user equipment to prevent the user equipment from changing the attachment, during the service access session, from the second radio access technology to the first radio access technology, the open connection distinct from the service access session;

trigger, in response to the determination, a timer; and release the open connection in response to expiration of the timer to enable the user equipment to change the attachment from the second radio access technology to the first radio access technology.

9. The apparatus of claim 8, wherein the service comprises one of a circuit-switched, supplementary, call forwarding, call barring and a do not disturb service.

10. The apparatus of claim 8, wherein the at least one memory and the computer program code are configured to, with the at least one processor, cause the apparatus to trigger the determination by reception of a message from the user equipment comprising an indication that the service access session is in progress.

11. The apparatus of claim 8, wherein the at least one memory and the computer program code are configured to, with the at least one processor, cause the apparatus to trigger the triggering of the timer by reception of a message from the user equipment comprising an indication that the service access session is in progress.

12. The apparatus of claim 11, wherein the message comprises one of a service settings adjustment message, a supplementary service adjustment settings message and a current settings inquiry message.

13. The apparatus of claim 8, wherein the at least one memory and the computer program code are configured to, with the at least one processor, cause the apparatus to determine the user equipment has changed attachment from the first radio access technology to the second radio access technology by a network procedure comprising a circuit-switched fallback procedure, and wherein the first radio access technology is a packet-only technology and the second radio access technology supports circuit switched service.

14. The apparatus of claim 8, wherein the first radio-access technology comprises a long term evolution technology and the second radio access technology comprises a wideband code division multiple access technology or a global system for mobile communications, GSM, technology.

15. A computer program product comprising a non-transitory computer-readable medium bearing computer program code embodied therein for use with a computer, the computer program code comprising:

code for determining, in a mobile switching center, that a service access session for a user equipment is in progress, wherein the user equipment has changed attachment from a first radio access technology to a second radio access technology;

code for maintaining, in response to the determination, an open connection with the user equipment to prevent the user equipment from changing the attachment, during the service access session, from the second radio access technology to the first radio access technology, the open connection distinct from the service access session;

code for triggering, in response to the determination, a timer; and code for releasing the open connection in response to expiration of the timer to enable the user equipment to change the attachment from the second radio access technology to the first radio access technology.

* * * * *